United States Patent
Allen et al.

(10) Patent No.: US 8,719,128 B2
(45) Date of Patent: May 6, 2014

(54) COMPUTER-FACILITATED SECURE ACCOUNT-TRANSACTION

(75) Inventors: Gene Allen, Vadnais Heights, MN (US); Kevin Kuntz, South St. Paul, MN (US)

(73) Assignee: TCF Financial Corporation, Wayzata, MN (US)

( * ) Notice: Subject to any disclaimer, the term of this patent is extended or adjusted under 35 U.S.C. 154(b) by 1070 days.

(21) Appl. No.: 11/956,802

(22) Filed: Dec. 14, 2007

(65) Prior Publication Data

US 2008/0147562 A1   Jun. 19, 2008

Related U.S. Application Data

(60) Provisional application No. 60/875,040, filed on Dec. 15, 2006.

(51) Int. Cl.
| | |
|---|---|
| *G06Q 40/00* | (2012.01) |
| *G06F 21/00* | (2013.01) |
| *G06Q 20/00* | (2012.01) |
| *G06Q 30/00* | (2012.01) |
| *G06F 1/00* | (2006.01) |

(52) U.S. Cl.
USPC ......... 705/35; 705/39; 705/14.27; 705/14.39; 713/155

(58) Field of Classification Search
CPC ....... G06Q 40/00; G06Q 20/10; G06Q 20/04; G06Q 40/02; G06Q 20/102
USPC ............. 705/6, 14, 27, 35, 37, 38, 39, 41, 43, 705/14.27, 14.39; 715/744; 713/155
See application file for complete search history.

(56) References Cited

U.S. PATENT DOCUMENTS

| | | | |
|---|---|---|---|
| 4,783,798 A * | 11/1988 | Leibholz et al. | 713/155 |
| 5,428,745 A * | 6/1995 | de Bruijn et al. | 726/3 |
| 5,745,886 A | 4/1998 | Rosen | |
| 5,778,067 A | 7/1998 | Jones et al. | |
| 5,832,453 A | 11/1998 | O'Brien | |
| 5,884,288 A | 3/1999 | Chang et al. | |

(Continued)

FOREIGN PATENT DOCUMENTS

WO   WO 9847258 A2 * 10/1998 ............... H04L 9/00

OTHER PUBLICATIONS

Giesen, Lauri, Double-duty debit cards; Credit Card Management, vol. 7, Iss. 8, p. 24, 5 pgs., New York: Nov. 1994.*

(Continued)

*Primary Examiner* — Thomas M Hammond, III
*Assistant Examiner* — Barbara Joan Amelunxen
(74) *Attorney, Agent, or Firm* — Crawford Maunu PLLC

(57) ABSTRACT

The handling of accounts and account transactions are implemented using a variety of different systems and methods. According to one embodiment a computer-facilitated system is implemented for handling accounts held by a user at a financial institution and an educational institution. A first database stores account balance information associated with a first account held at one of the institutions. A second database stores account balance information associated with a second account held at the other institution. Logic, located at one institution, encrypts an identifier of the first account, associates a resulting encrypted identifier with the second account and decrypts the encrypted identifier. A database interface transmits the encrypted identifier to the second database for storage. A user interface provides the user with the account balance information associated with the accounts in response to the logic decrypting the encrypted identifier.

19 Claims, 3 Drawing Sheets

(56) References Cited

U.S. PATENT DOCUMENTS

| | | | |
|---|---|---|---|
| 5,903,880 A | 5/1999 | Biffar | |
| 5,905,976 A | 5/1999 | Mjolsnes et al. | |
| 5,907,831 A * | 5/1999 | Lotvin et al. | 705/14.27 |
| 5,915,023 A | 6/1999 | Bernstein | |
| 5,920,629 A | 7/1999 | Rosen | |
| 5,920,847 A | 7/1999 | Kolling et al. | |
| 5,937,396 A * | 8/1999 | Konya | 705/43 |
| 6,029,151 A | 2/2000 | Nikander | |
| 6,167,236 A * | 12/2000 | Kaiser et al. | 455/41.1 |
| 6,275,939 B1 * | 8/2001 | Garrison | 726/6 |
| 6,484,147 B1 * | 11/2002 | Brizendine et al. | 705/14.27 |
| 6,859,212 B2 * | 2/2005 | Kumar et al. | 715/744 |
| 6,948,070 B1 * | 9/2005 | Ginter et al. | 713/193 |
| 6,963,857 B1 | 11/2005 | Johnson | |
| 7,203,836 B1 * | 4/2007 | Maringer et al. | 713/169 |
| 7,249,096 B1 * | 7/2007 | Lasater et al. | 705/39 |
| 7,308,426 B1 * | 12/2007 | Pitroda | 705/35 |
| 7,761,353 B1 * | 7/2010 | Silverman | 705/35 |
| 2002/0038277 A1 * | 3/2002 | Yuan | 705/37 |
| 2003/0177087 A1 * | 9/2003 | Lawrence | 705/38 |
| 2004/0167822 A1 | 8/2004 | Chasen et al. | |
| 2006/0012473 A1 * | 1/2006 | Bishop et al. | 340/539.1 |
| 2006/0026440 A1 * | 2/2006 | Sauvebois | 713/185 |
| 2006/0155619 A1 * | 7/2006 | Rhiando et al. | 705/35 |
| 2007/0119919 A1 * | 5/2007 | Hogg et al. | 235/380 |
| 2007/0239603 A1 * | 10/2007 | Lasater et al. | 705/41 |
| 2008/0021840 A1 * | 1/2008 | Beenau et al. | 705/64 |
| 2008/0255990 A1 * | 10/2008 | Moore et al. | 705/42 |
| 2008/0258864 A1 * | 10/2008 | Hattori et al. | 340/5.8 |
| 2009/0043681 A1 * | 2/2009 | Shoji et al. | 705/35 |
| 2011/0288976 A1 * | 11/2011 | Ogram et al. | 705/35 |

OTHER PUBLICATIONS

•Giesen, Lauri, Double-duty debit cards, Credit Card Management, vol. 7, Iss. 8, p. 24, 5 pags., New York: Nov. 1994.*
The Campus Card Conundrum, Card Technology (1998), 9 pgs.
Blackboard Commerce Suite publication, 2005 Blackboard Inc., 16 pgs.

* cited by examiner

COMPUTER-FACILITATED SECURE ACCOUNT-TRANSACTION

RELATED PATENT DOCUMENTS

This patent document claims the benefit, under 35 U.S.C. §119(e), of U.S. Provisional Patent Application No. 60/875,040 filed on Dec. 15, 2006 and entitled: "Computer-Facilitated Secure Account-Transaction," which is fully incorporated herein by reference.

FIELD OF THE INVENTION

The present invention relates to a computer-facilitated system and method for reconciling, tracking and/or managing transactions, in response to a user article, between a financial institution and an educational institution. In particular embodiments, the invention is directed to such transactions relative to a checking (or another) account at a banking institution and relative to a student transaction account at an educational institution.

BACKGROUND

Financial institutions provide account services to account holders using a variety of interfaces, such as web interfaces, tellers and automated teller machines (ATMs). These interfaces allow for multiple access points and otherwise facilitate access to one or more accounts held by the account holders. Similarly educational institutions provide account services to students, faculty, staff, alumni or others with an appropriate relationship with the university. The accounts can be typically accessed through web interfaces or through computers (e.g., specialized computer kiosks) provided by the educational institution. Such computers require an investment in initial funding and maintenance costs by the educational institution.

Users with an account at both a financial institution and an educational institution often desire to move funds from one account to the other. Such transfer can be difficult to effect because the individual typically needs to access the accounts separately and use some mechanism to transfer the funds between the accounts. For instance, some educational institutions allow for funds to be deposited in an account through checks, credit cards and cash deposits. Such methods often require the individual to access both accounts individually (e.g., to withdraw cash for depositing in another account) or to deal directly with a person who accepts the transfer of funds. Directly dealing with a person often limits the account holder to normal business hours and can cost the institution funds because the institution pays for the employees to process the account transfers.

These and other issues have presented challenges to the implementation of accounts held by users at financial and educational institutions.

BRIEF DESCRIPTION OF THE DRAWINGS

The invention may be more completely understood in consideration of the detailed description of various embodiments of the invention that follows in connection with the accompanying drawings, in which.

Figure 1:
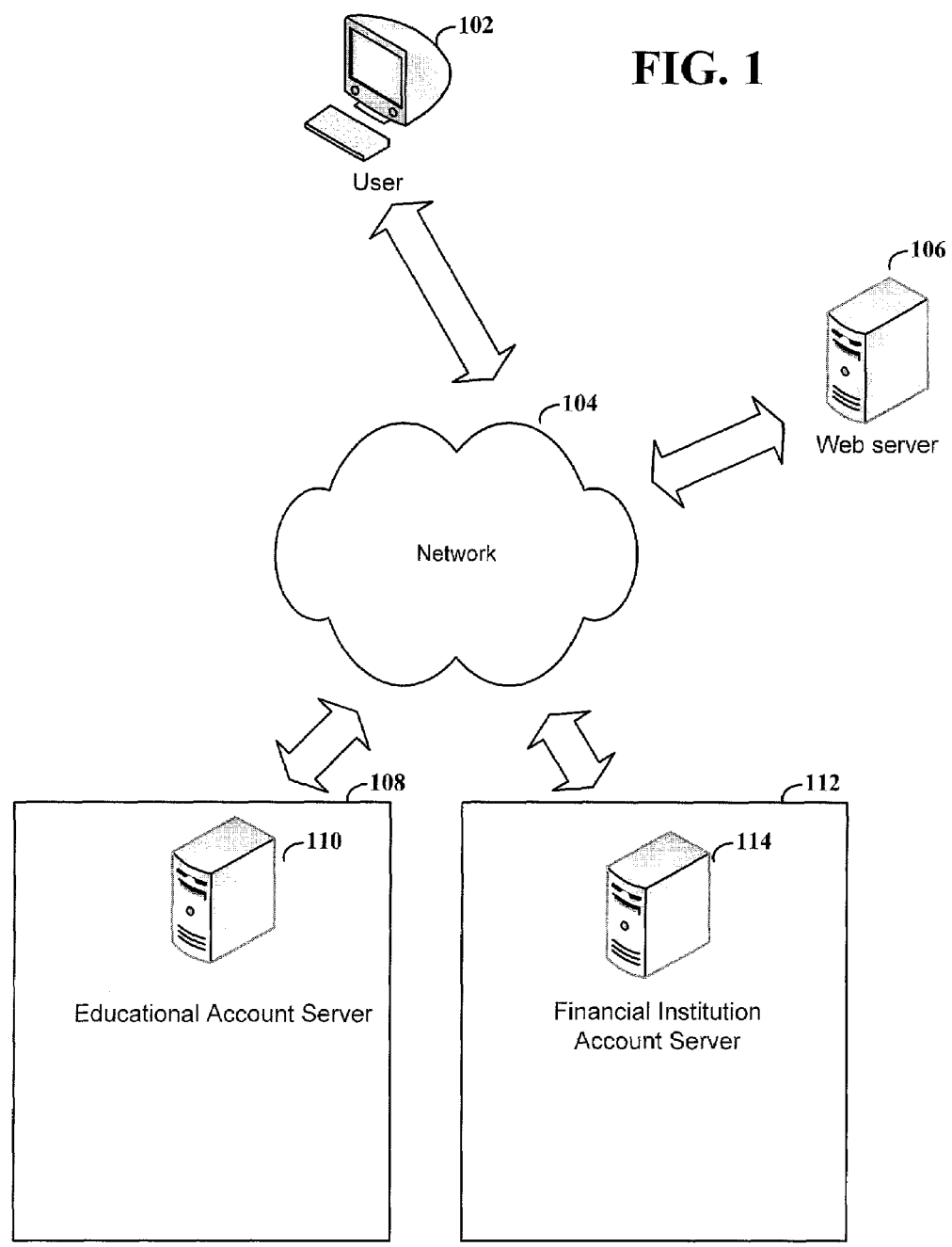
FIG. 1 is a block diagram showing a system for providing transactions between accounts held at a financial institution system and an education institution system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In various embodiments, the present invention relates to a computer-facilitated system and method for reconciling, tracking and/or managing transactions, where one or more of the transactions are in connection with a user article/identifier that is used by a student (or other individual) and associated with respective accounts managed by a financial institution and an educational institution.

According to an example embodiment of the present invention, a system is implemented for facilitating the access to accounts held by a user at both a financial institution and an educational institution. In a specific instance, the system provides a user with a single interface that provides access to both accounts as well as allows the user to issue transactions between accounts. Such interfaces can be implemented for use with automated teller machines, websites, kiosks and the like. Using the interface, the user provides identification (e.g., username, password or identification card) used by the system to determine the proper accounts and to verify the user's identity. The account information can be provided from account databases at each of the institutions. In a particular instance, the interface is maintained by the educational institution. The account information can be sent from each of the account databases without knowledge of the information by the non-originating institution. In another instance, the interface can be maintained by the financial institution or a third party.

According to one embodiment of the present invention, the educational institution provides interfaces for users to access their account information. The educational institution issues a request for information from the financial institution for an account associated with the user. The request indicates the associated account by sending an encrypted account identifier. According to one instance, the encrypted account identifier is provided by the financial institution to the educational institution. The educational institution need not be able to decrypt the account identifier because the decryption can be accomplished at the financial institution. This can be particularly useful for limiting the educational institution's liability and risks associated with maintaining the security of information relative to the financial institution's accounts.

According to another example embodiment of the present invention, the educational institution provides interfaces for users to access their account information. Sensitive information related to accounts held at the financial institution is encrypted for transmission from the financial institution to the user requesting the account access. In a particular instance, the user accesses the account from a remote computer using a network. The remote computer may be a computer that is not under the direct control of either the educational institution or the financial institution, such as a personal computer owned by the user. Through the interface provided by the educational institution, the remote computer establishes a secured link with the financial institution. The interface, and thus the educational institution, need not directly control the secured link or have the ability to decode the information sent via the secured link. This can be particularly useful for limiting the liability and exposure of the educational institution, while providing an interface for accessing accounts held at both institutions.

Turning now to the figures, FIG. 1 is a block diagram showing a system for providing transactions between accounts held at a financial institution system and an education institution system, according to an example embodiment of the present invention. Educational institution 108 and financial institution 112 provide account information using educational account server 110 and financial institution account server 114, respectively. User 102 accesses the account servers through network 104. In a particular instance, user 102 accesses the accounts through web server 106. Web server 106 links information from servers 110 and 114 to user 102, via network 104. Web server 106 can be implemented by educational institution 108, financial institution 112 or a third party on behalf of either of the institutions.

In one embodiment of the present invention, web server 106 provides an interface that allows user 102 to establish a secure connection with one of servers 110 and 114. This connection can be established using an encrypted transmission method, such as transport layer security (TLS), secured socket layer (SSL) or similar transaction security methods. In many such methods, the information is encrypted such that only the end points of the transmission (i.e., user 102 and server 110/114) have the capability of decrypting the information. Thus, web server 106 need not have the capability of decrypting the data sent between user 102 and server 110/114. In one instance, web server 106 can redirect user 102 to a web interface provided by server 110/114 along with verification information provided by user 102. The web interface provided by server 110/114 can display the sensitive information and allow the user to perform account transactions. Should the user desire to view the account held at the other institution, the web interfaces can provide a link to the appropriate site.

According to one embodiment of the present invention, servers 110/114 contain account identifiers for accounts associated with a user common between the institutions. To increase security and reduce liability of the institutions, the identifier can be encrypted such that the specific account is not determinable from the identifier. Accordingly, when user 102 is directed from one server to the other, the identifier can be used to indicate the appropriate account information to be displayed by the other server. The account identifiers can also be used for monitoring, recording and similar purposes without comprising the account information of user 102.

According to another embodiment of the present invention, the web server 106 can provide a website that allows sensitive information to be displayed after being decrypted by the user 102. For instance, web server 106 presents a template in which information sent from server 110/114 is displayed upon decryption by user 102. This information can be encrypted using a secure connection between user 102 and server 110/114. This can be particularly useful for reducing the liability and risk associated with maintaining web server 106. In a particular instance, web server 106 provides user 102 with software that is used to establish a connection directly with server 110/114.

Figure 2:
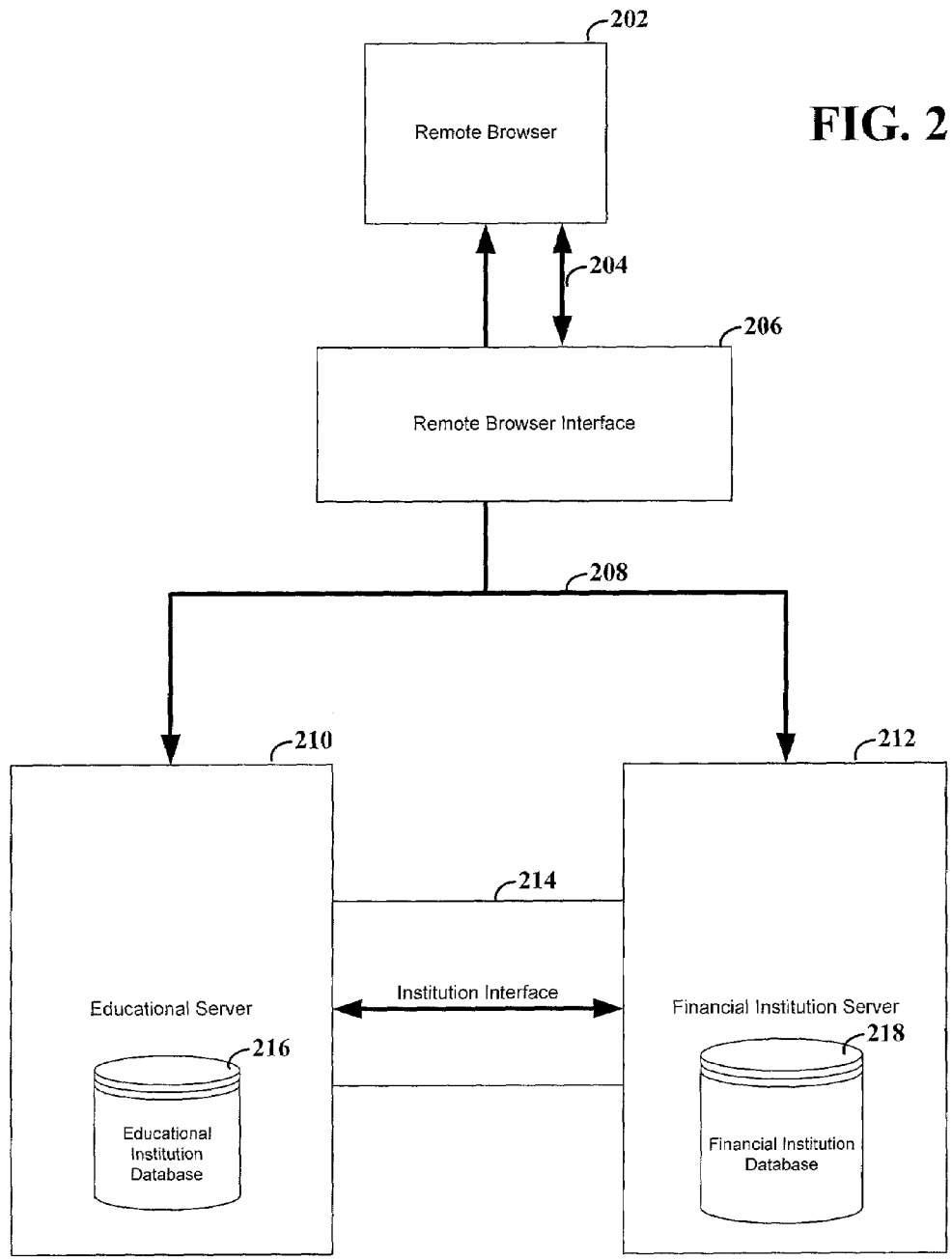
FIG. 2 is a block diagram showing information flow between a financial institution system and an education institution system, according to an example embodiment of the present invention.

FIG. 2 is a block diagram showing information flow between a financial institution system and an education institution system, according to an example embodiment of the present invention. Remote browser 202 can be used by an authorized account holder to remote browser interface 206 through connection (session) 204. Connection 204 can optionally be a secured connection using SSL, TSL or similar protocols. Remote browser interface 206 provides a mechanism for remote browser 202 to establish secured connection 208 with one of (or both) servers 210 and 212. In one instance, secured connection 208 can be established using a secured protocol that requires handshaking between remote browser 202 and server 210/212. For example, the server 210/212 can send its public encryption key to remote browser 202. A public encryption key for a server allows any computer to encrypt the data, while only allowing the data to be decrypted using a private key known to the server. Remote browser 202 transmits information to the server used to establish a secure encryption. An example of such information is a large piece of random data that is embedded in another large number (e.g., using Public Key Cryptography Standards (PKCS)). The random data is encrypted with the server's public key, and sent to the server. Only the server, with its private key, can decode the information to determine the original random data. The random data (known only to remote browser 202 and server 210/212) is then used to generate a set of conventional keys to encrypt the rest of the session using secure connection 208. Thus, browser interface 206 does not have knowledge of the details of secure connection 208 because it does not directly participate in the handshake protocol between remote browser 202 and server 210/212

The secured connection can be further protected by verifying that server 210/212 has a valid certificate. Certificates are verifications that the connected server is valid and can be provided by a third party. Accordingly, account information from databases 216 and 218 can be securely transmitted to remote browser 202 even if remote browser interface 206 is compromised.

In some instances, a user may request transfers between accounts held at the two institutions. Such transactions can be implemented using institution interface 214. In one instance, this interface is a secure interface using encryption techniques, a dedicated connection or the like.

Figure 3:
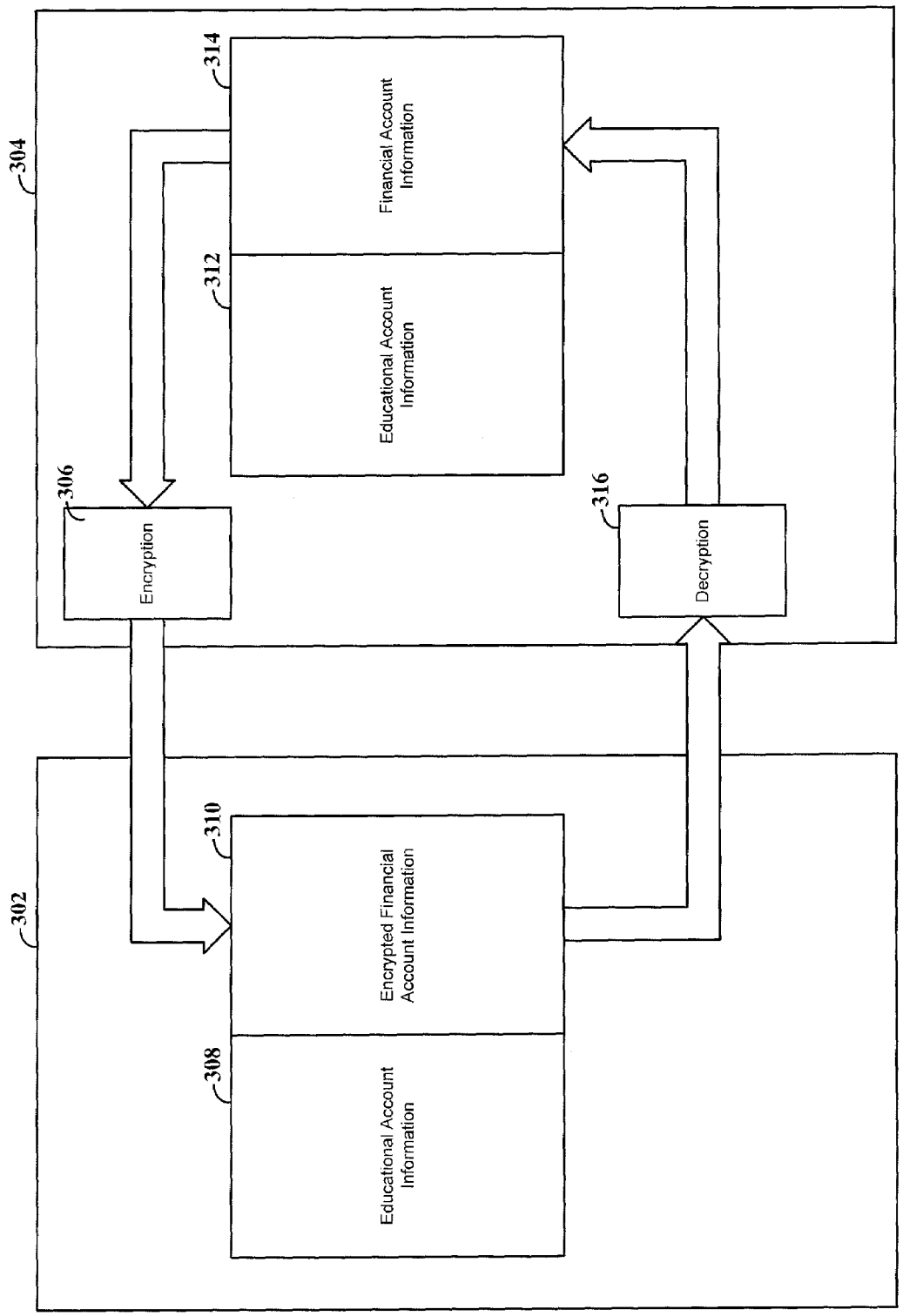
FIG. 3 is a flow diagram showing exemplary steps for implementing financial transactions between accounts, according to an example embodiment of the present invention.

FIG. 3 is a flow diagram showing exemplary steps for implementing financial transactions between accounts, according to an example embodiment of the present invention. Account information pertaining to transactions between accounts held at educational institution system 302 and financial institution system 304 are sent between corresponding databases. A common example of a transaction carried out between accounts is a monetary transfer from one account to the other account.

In order to perform transactions between accounts, systems 302 and 304 send transaction requests between each other. Each of the systems adequately identifies the accounts involved in the transactions in the transaction requests. Data stored by systems 302 and 304 is often sensitive data which should be protected from unauthorized users attempting to obtain access to the data. An unauthorized user may attempt to obtain access to the database directly, or by monitoring the transmission between the systems.

Educational system 302 stores the educational account information 308 in a database. In order to issue transaction requests, record transactions and perform transaction verifications, the educational system 302 also stores encrypted financial account information 310. The encrypted account information 310 is provided by financial institution 304 using encryption as shown by block 306. When issuing transactions between accounts, the encrypted account information is used to increase the security of the transactions. Moreover, the encrypted form of the account information can be stored in the database increasing the security of the database. In one instance, educational system 302 is not provided with the decryption mechanism shown by block 316. Accordingly, even if the integrity of system 302 is compromised, the account information of the financial system 304 can remain secure.

In one instance, the financial institution maintains a record of the account information for both institutions and can thus provide oversight of the accounts. This is shown by educational account information 312 and financial account information 314. In another instance, the roles of financial institution and the educational instruction can be reversed. Alternatively, both systems can implement encryption/decryption methods similar to blocks 306 and 316, such that neither system has a decryption mechanism for the account information provided from the other system.

In one embodiment, some of the account information can be encrypted according to the method discussed herein, while the remaining account information is accessible by the receiving system. For instance, the account numbers can be encrypted and represented by an encrypted number to protect fraudulent access to the account, while the account balances are available to the receiving institution. This can permit the receiving institution to authorize some transactions based upon the account balances or to provide account balance information for both accounts to the account holder. Moreover, analysis of account transactions can be performed by systems and individuals without compromising the true account numbers of the sending system.

Various methods can be used by encryption/decryption blocks 306 and 316. In instances where the data does not need to be decrypted by the receiving system, a symmetric-key encryption or single-key encryption method can be used. A symmetric/single key encryption method is a method that requires knowledge of the encryption key to encode and decode the data. Examples of such methods are implemented using Advanced Encryption Standard 256, Blowfish, Data Encryption Standard, and International Data Encryption Algorithm.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, encryption methods other than SSL or TSL may be amenable to implementation using multiple software and computer hardware devices. In addition, one or more of the above example embodiments and implementations may be implemented with a variety of approaches, including various Internet based approaches. Further, the skilled artisan would appreciate that the above-discussed interfaces and depicted modules and blocks can be implemented in a variety of manners including, for example, as a CPU node communicatively-coupled via a public or private network. These approaches are implemented in connection with various example embodiments of the present invention. Such modifications and changes do not depart from the true scope of the invention.

What is claimed is:

1. A computer-facilitated system for handling a first monetary account held by a user at one of a financial institution and an educational institution and a second monetary account held by the user at the other of the educational institution and the financial institution, the system including:
    a first database that stores account balance information associated with the first account and that is controlled by a computer system at said one of the financial institution and the educational institution;
    a second database that stores account balance information associated with the second account and that is controlled by a computer system at said other of the educational institution and the financial institution;
    a server including a CPU and having logic located at said one of the financial institution and the educational institution, the server being configured and arranged to encrypt an identifier of the first account to create an encrypted identifier, that associates the encrypted identifier with the second account and that decrypts the encrypted identifier;
    a server configured and arranged to provide a database interface that is configured and arranged to transmit the encrypted identifier and data corresponding to the association to the second database for storage therein and that receives the encrypted identifier from the second database for decryption by said logic; and
    a user interface that is configured and arranged to provide the user with access via a remote computer to the account balance information associated with the second account and the account balance information associated with the first account via a secured connection to one of the first and second databases, wherein the secured connection is accomplished using a handshake protocol between the remote computer and said one of the first and second databases such that the user interface does not participate in the handshake protocol, and wherein one of the first and second accounts is managed by the educational institution to permit withdrawal of money in response to receipt of the encrypted identifier corresponding to a user at the educational institution.

2. The system of claim 1, wherein the logic encrypts and decrypts the identifier using an encryption key and the encryption key is not provided to said other of the educational institution and the financial institution.

3. The system of claim 1, wherein the user interface is an Internet-based website.

4. The system of claim 1, wherein one of the first and second accounts is one of a savings and checking account and the other of the first and second accounts is a university debit account.

5. The system of claim 2, wherein the encryption is accomplished using a symmetric-key algorithm.

6. The system of claim 1, wherein the secured connection is accomplished using a handshake protocol between the remote computer and said one of the first and second databases such that the user interface does not participate in the handshake protocol.

7. The system of claim 6, wherein the second database stores account balance information associated with the first account in an encrypted form for which the computer system at the educational institution is not configured and arranged to decrypt.

8. The system of claim 6, wherein the second database stores account balance information associated with the first account in an encrypted form for which the computer system at the educational institution is not configured and arranged to decrypt and for which the computer system at the financial institution is configured and arranged to decrypt.

9. The system of claim 1, wherein the system is configured to allow access to the user interface in response to a presentation of an identification card issued by the educational institution for users associated with the educational institution.

10. The system of claim 9, wherein the user interface is an Internet-based website.

11. The system of claim 10, wherein one of the first and second accounts is one of a savings and checking account and the other of the first and second accounts is a university debit account.

12. The system of claim 9, wherein, in response to receiving the identification card issued by the educational institution, the user interface is configured to provide user options that are enabled by receipt of the identification card.

13. A method of using a system for handling a first monetary account held by a user at one of a financial institution and an educational institution and a second monetary account held by the user at the other of the educational institution and the financial institution, the method comprising:

storing, in a first database, account balance information associated with the first account and that is controlled by a computer system at said one of the financial institution and the educational institution;

storing, in a second database, account balance information associated with the second account and that is controlled by a computer system at said other of the educational institution and the financial institution;

encrypting, via a server, an identifier of the first account to create an encrypted identifier that associates the encrypted identifier with the second account and that decrypts the encrypted identifier, wherein the server comprises a CPU and logic to perform said encrypting located at said one of the financial institution and the educational institution;

transmitting, via a database interface, the encrypted identifier and data corresponding to the association to the second database for storage therein;

receiving, via the database interface, the encrypted identifier from the second database for decryption by said logic; and providing, via a user interface, the user with access, via a remote computer, to the account balance information associated with the second account and the account balance information associated with the first account via a secured connection to one of the first and second databases, wherein the secured connection is accomplished using a handshake protocol between the remote computer and said one of the first and second databases such that the user interface does not participate in the handshake protocol, and wherein one of the first and second accounts is managed by the educational institution to permit withdrawal of money in response to receipt of the encrypted identifier corresponding to a user at the educational institution.

14. The method of claim 13, wherein the identifier is associated with an identification card issued by the educational institution for users associated with the educational institution.

15. The method of claim 14, wherein, in response to determining the identification card was issued by the educational institution, the user is provided with options that are enabled by the determination.

16. The method of claim 13, wherein the user requests access via an Internet-based website.

17. The method of claim 13, wherein one of the first and second accounts is one of a savings and checking account and the other of the first and second accounts is a university debit account.

18. The method of claim 13, further including in response to the user requesting access to the first and second accounts using a remote computer, decrypting the encrypted identifier at said one of the financial institution and the educational institution; and identifying the first account using the identifier.

19. The method of claim 18, further including transferring account balance information associated with the second account from the second database and account balance information associated with the first account from the first database to the remote computer.

* * * * *